(12) United States Patent
Kies

(10) Patent No.: US 7,725,119 B2
(45) Date of Patent: May 25, 2010

(54) SYSTEM AND METHOD FOR TRANSMITTING GRAPHICS DATA IN A PUSH-TO-TALK SYSTEM

(75) Inventor: Jonathan K. Kies, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 942 days.

(21) Appl. No.: 10/924,479

(22) Filed: Aug. 24, 2004

(65) Prior Publication Data

US 2006/0046755 A1 Mar. 2, 2006

(51) Int. Cl.
*H04B 7/00* (2006.01)

(52) U.S. Cl. .................... 455/518; 455/517; 455/520; 455/521; 455/418; 455/550.1

(58) Field of Classification Search ............. 455/500, 455/507, 516–521, 526; 715/740, 706, 751, 715/753; 345/629, 861; 717/168–178
See application file for complete search history.

(56) References Cited

U.S. PATENT DOCUMENTS

| | | | |
|---|---|---|---|
| 5,870,149 A | 2/1999 | Comroe et al. | |
| 6,418,330 B1 | 7/2002 | Lee | 455/567 |
| 6,690,955 B1 | 2/2004 | Komiyama | 455/566 |
| 7,099,291 B2 | 8/2006 | Harris et al. | |
| 7,307,963 B2 | 12/2007 | Chow | |
| 2002/0197967 A1* | 12/2002 | Scholl et al. | 455/118 |
| 2003/0076367 A1* | 4/2003 | Bencze et al. | 345/861 |
| 2004/0057449 A1 | 3/2004 | Black | |
| 2004/0077358 A1 | 4/2004 | Bennett et al. | 455/455 |
| 2004/0092295 A1 | 5/2004 | Yamada | 455/567 |
| 2004/0103158 A1 | 5/2004 | Vella et al. | 709/206 |
| 2004/0147814 A1* | 7/2004 | Zancho et al. | 600/300 |
| 2004/0219925 A1* | 11/2004 | Ahya et al. | 455/450 |

(Continued)

FOREIGN PATENT DOCUMENTS

CL 2149-05 3/2006

(Continued)

OTHER PUBLICATIONS

International Search Report, PCT/US2005/030079 - International Search Authority - US, Jan. 30, 2006.

(Continued)

*Primary Examiner*—Edward Urban
*Assistant Examiner*—Fayyaz Alam
(74) *Attorney, Agent, or Firm*—Raphael Freiwirth

(57) ABSTRACT

A system and method that transmits and displays graphical images among wireless devices in a push-to-talk system. A predefined set of graphical images is stored in a wireless device, and when a user presses a push-to-talk button on the wireless device, the wireless device displays a list of predefined images to the user to select. After the user selects an image, the wireless device transmits an image code associated with the selected image to a server for relaying to every wireless device in a push-to-talk communication group. When a receiving wireless device receives the image code, it retrieves an image corresponding to the image code from the predefined set and displays the image to the user of the wireless device.

22 Claims, 7 Drawing Sheets

U.S. PATENT DOCUMENTS

| | | | |
|---|---|---|---|
| 2004/0249765 A1* | 12/2004 | Leon | 705/64 |
| 2005/0124365 A1* | 6/2005 | Balasuriya et al. | 455/518 |
| 2005/0223328 A1* | 10/2005 | Ashtekar et al. | 715/706 |
| 2005/0239450 A1* | 10/2005 | Wesby | 455/418 |
| 2006/0041848 A1* | 2/2006 | Lira | 715/805 |
| 2006/0212818 A1* | 9/2006 | Lee | 715/753 |

FOREIGN PATENT DOCUMENTS

| | | |
|---|---|---|
| CL | 2150-05 | 3/2006 |
| GB | 2338150 | 12/1999 |
| JP | 2002-009844 | 1/2002 |
| KR | 20020048136 | 6/2002 |
| RU | 2190309 | 2/1997 |
| WO | 99063773 | 12/1999 |
| WO | 02085051 | 10/2002 |
| WO | 2004028112 | 4/2004 |

OTHER PUBLICATIONS

International Preliminary Report on Patentability, PCT/US2005/030079 - The International Bureau of WIPO - Geneva, Switzerland, Feb. 28, 2007.

Written Opinion, PCT/US2005/030079 - International Search Authority - US, Jan. 30, 2006.

European Search Report - EP05790677 - Search Authority - munich Patent Office - Jun. 10, 1999.

* cited by examiner

SYSTEM AND METHOD FOR TRANSMITTING GRAPHICS DATA IN A PUSH-TO-TALK SYSTEM

BACKGROUND OF THE INVENTION

1. Field of the Invention

The present invention generally relates to wireless telecommunications, and more specifically relates to a system and method for transmitting graphics in a push-to-talk system on a wireless network.

2. Description of the Related Art

Technology advancement has made mobile telephones or wireless communications devices cheap and affordable to almost everyone. As the wireless telephones are manufactured with greater processing ability and storage, they also become more versatile and incorporate many features including the direct radio communication capability between two or more individual handsets. This direct radio communication capability is commonly known as the push-to-talk (PTT) or "walkie-talkie" feature that allows a user with one handset to communicate with a predefined set of members of a group without dialing a destination telephone number.

In a PTT system, a handset uses one single frequency for both upward and downward communications with a remote server, while in a normal wireless communication a wireless telephone uses two frequencies for communicating with the server, one for upward and one for downward communications. The PTT system requires the person who is speaking to press a button while talking and then release it when he is done. Any listener in the group can then press their button to respond. In this manner, the system can determine which direction the signal should be traveling in. When a user makes a call to a receiving party or a group of receiving parties using the PTT system, the user's handset first makes a request to a remote server. The remote server verifies that no other party is using the communication channel and the channel is available then assigns the channel to the user. The user's message is received by the server and the server duplicates the message for each and every receiving party. After the message is transmitted to every receiving party, the channel is released and ready for use by other parties.

The PTT system relies on cellular technology to connect to the recipient devices. Conversely, a normal "walkie-talkie" style two-way radio will only operate if the radios are within a certain distance of each other. Systems using the PTT feature can communicate anywhere within a service area specified by its service provider, typically a large urban area or even nationally.

Generally, a communication through the PTT feature employs a half-duplex channel with limited bandwidth, and a PTT communication centralizes on the audio aspect with no other data capability because of bandwidth limitation. Consequently, the members of the PTT communication group cannot easily express emotions that are indescribable verbally but improve significantly understanding among the members, such as through the relay of "emotions."

SUMMARY OF THE INVENTION

The system and method according to the invention enables transmission and display of graphical images among wireless devices in a push-to-talk system. A predefined set of graphical images is stored in a wireless device, and when a user presses a push-to-talk button on the wireless device, the wireless device displays a list of predefined images to the user to select. After the user selects an image, the wireless device transmits an image code associated with the selected image to a server for relaying to every wireless device in a push-to-talk communication group. When a receiving wireless device receives the image code, it retrieves an image corresponding to the image code from the predefined set and displays the image to the user of the wireless device.

In one embodiment, the method is for transmitting graphical image information in a push-to-talk system on a wireless telecommunication network and includes the steps of displaying a predefined set of graphical images to a user of a wireless device, receiving an indication of a selected graphical image at the wireless device, selecting at the wireless device an image code corresponding to the indication of the selected graphical image, and transmitting the image code to a remote server via a push-to-talk communication channel. The predefined set resides on the wireless device and each graphical image in the predefined set is identified by an image code.

In another embodiment, the method is for displaying graphical image information in a push-to-talk communication system. The method includes the steps of receiving at a wireless device an indication of a push-to-talk request, receiving an image code at the wireless device, selecting a graphical image corresponding to the image code from a predefined set of graphical images, and displaying the graphical image to a user of the wireless device. The method may also include the additional steps of receiving a first image set code from the remote server, comparing the first image set code with a second image set code, and if the first image set code differs from the second image set code, sending a request for new graphical images to the remote server.

In yet another embodiment, the method is for displaying graphical image information in a push-to-talk system and includes the steps of receiving a request for a push-to-talk session at a server, receiving an image code corresponding to a graphical image at the server through a push-to-talk communication channel, determining a group of intended receiving wireless telecommunication devices for the push-to-talk session, sending an indication of the push-to-talk session to each intended receiving wireless telecommunication device in the group, and sending the image code through the push-to-talk communication channel to each intended receiving wireless telecommunication device in the group. The method may also includes the additional steps of receiving a graphical image from the remote user device, storing the graphical image in an image database, and assigning a new image set identification code to the image database.

In one embodiment, the apparatus enables transmission of graphical images during a push-to-talk session. The apparatus includes a transceiver for transmitting and receiving push-to-talk communications from a remote server, a storage unit for receiving a predefined set of graphical images received from the remote server, a display unit for displaying the predefined set of graphical images to the user, a user interface unit for receiving an indication of a selected graphical image from the user, a push-to-talk interface for receiving a push-to-talk request from the user, and a controller for selecting an image code corresponding to the indication and transmitting the image code and the push-to-talk request to the remote server. The predefined set of graphical images is associated with an image set code.

The server is in communication with a wireless communication network, and a plurality of wireless communication devices capable of communicating with the server through the wireless communication network, wherein a first wireless communication device transmits a image code with a push-to-talk communication to the server, the server transmits the image code with the push-to-talk communication to a second wireless communication device, and the second wireless communication device receives the image code with the push-to-talk communication and displays an image identified by the image code. Each wireless communication device having a predefined set of graphical images and each graphical image in the predefined set being identified by an image code. The server includes information on at least one push-to-talk communication group with a plurality of members.

The present system and methods are therefore advantageous as they provide a group of wireless communication devices the ability to communicate through graphic images. The availability of a predefined set of graphical images provides a wide range of images for the user to select from. Further, the conveyance of shorter graphical image codes allows the conservation of expensive bandwidth.

Other advantages and features of the present invention will become apparent after review of the hereinafter set forth Brief Description of the Drawings, Detailed Description of the Invention, and the Claims.

DETAILED DESCRIPTION OF THE INVENTION

In this description, the terms "communication device," "wireless device," "wireless communications device," "wireless handset," "handheld device," and "handset" are used interchangeably, and "fetch" and "download" are used interchangeably, the term "application" as used herein is intended to encompass executable and nonexecutable software files, raw data, aggregated data, patches, and other code segments. Further, like numerals refer to like elements throughout the several views, and the articles "a" and "the" includes plural references, unless otherwise specified in the description.

In overview, the system and method for transmitting and displaying graphical information in a push-to-talk system enable a user to send a graphical image with his audio message to members of a communication group or alternatively enables the user to send the graphical image in lieu of the audio message. The graphical images are pre-installed in each handset of the communication group and each graphic image is associated with a predefined image code. The user selects a graphical image when activating the PTT feature and the image code associated with the selected graphical image is sent to the members of the communication group. When the wireless handset of a member receives the image code, the wireless handset selects an associated image and displays the image to the receiving member. The use of the system and method therefore enables transmission of graphical information without increasing significantly traffic of a wireless communication network.

Figure 1:
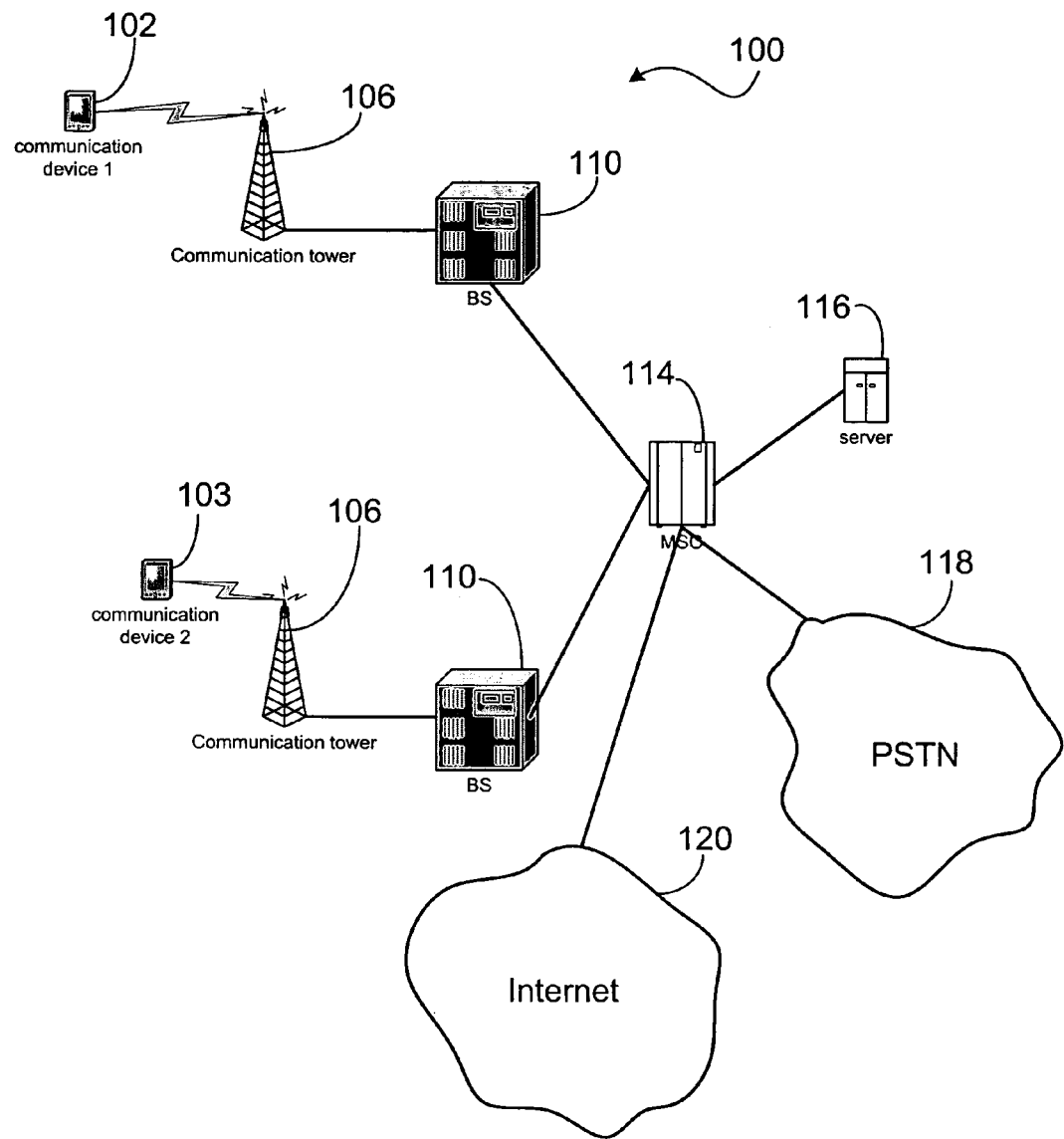
FIG. 1 is a wireless network architecture-that supports the transmission and display of graphical images in a push-to-talk system.

FIG. 1 depicts a communication network 100 used according to the present invention. The communication network 100 includes one or more communication towers 106, each connected to a base station (BS) 110 and serving users with communication device 102. The communication device 102 can be cellular telephones, pagers, personal digital assistants (PDAs), laptop computers, or other hand-held, stationary, or portable communication devices that supports push-to-talk (PTT) communications. The commands and data input by each user are transmitted as digital data to a communication tower 106. The communication between a user using a communication device 102 and the communication tower 106 can be based on different technologies, such code division multiplexed access (CDMA), time division multiplexed access (TDMA), frequency division multiplexed access (FDMA), the global system for mobile communications (GSM), or other protocols that may be used in a wireless communications network or a data communications network. The data from each user is sent from the communication tower 106 to a base station (BS) 110, and forwarded to a mobile switching center (MSC) 114, which may be connected to a public switched telephone network (PSTN) 118 and the Internet 120. The MSC 114 may be connected to a server 116 that supports the PTT feature in the communications network 100. The server 116 includes an application that supports the PTT feature besides storing a table that lists members of each communication group. Optionally, the server 116 may be part of the MSC 114.

Figure 2:
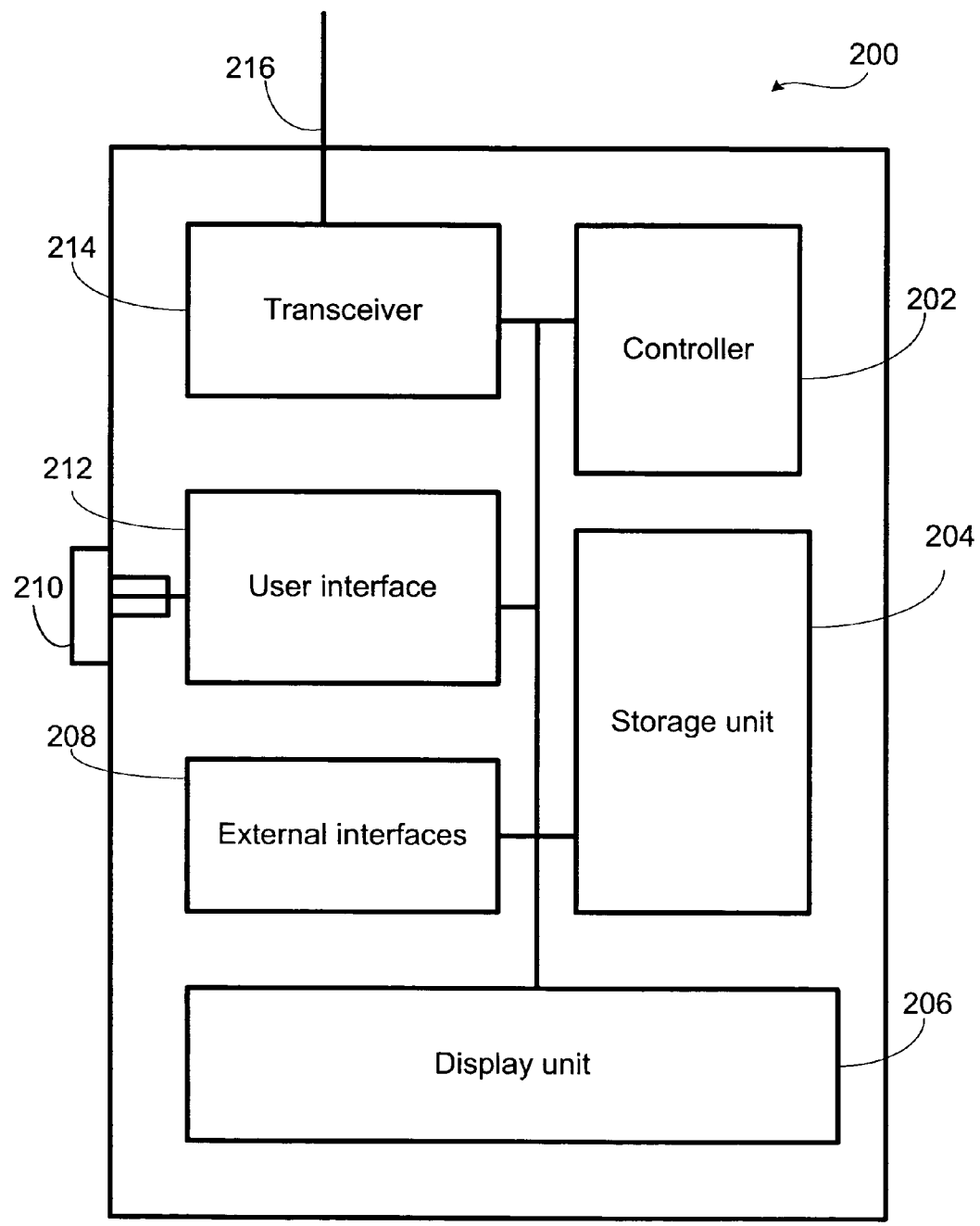
FIG. 2 is a block diagram of a wireless device that supports the transmission and display of graphical images in a push-to-talk system.

FIG. 2 illustrates a block diagram 200 of a wireless handset 102. The wireless handset 102 includes a controller 202, a storage unit 204, a display unit 206, an external interface unit 208, a user interface unit 212, a push-to-talk activation unit 210, a transceiver 214, and an antenna 216. The controller 202 can be hardware, software, or a combination thereof. The storage unit 204 may store a set of predefined graphical images, and the set of predefined graphical images may include pictures of members in each group, drawings that reflect human emotions, graphics with data information, etc. Alternatively, the set of predefined graphical images may be stored at the remote server 116. The display unit 206 may display graphical images or other digital information to the user. The external interface unit 208 controls hardware, such as speaker, microphone, and display unit, used for communication with the user. The user interface unit 212 controls hardware, such as keypad and push-to-talk activation unit 210. The transceiver 214 transmits and receives radio signals to and from a communication tower 106. The controller 202 interprets commands and data received from the user and the communication network 100.

Generally, the graphical images are defined and provided by the service provider. The graphical images may include standard emotive icons or "emotions." Alternatively, the graphical images may be defined and/or created by members of the communication group and be self-identifying. The graphical images may be uploaded to the server 116 by a user using a computing device that accesses the server 116 via the Internet 120. The graphical images may also be uploaded to the server 116 from a wireless handset 102 if the wireless handset 102 is equipped with a camera or other graphics creating devices. Each graphical image is assigned a graphical image code and associated with a graphical image set. Each graphical image set is identified by an image set code.

The graphical images on a wireless device must be kept updated and synchronized with other wireless devices in the communication group.

Figure 3:
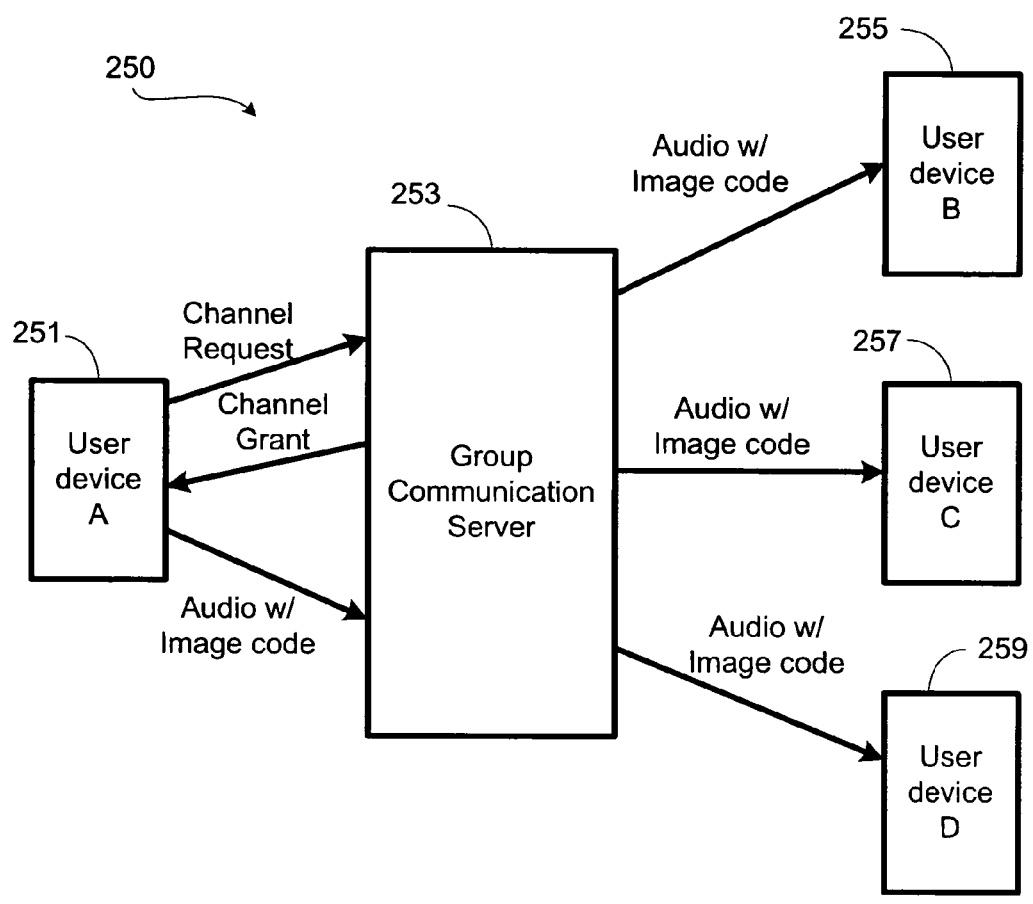
FIG. 3 is a diagram representing interactions between a server and wireless handsets.

FIG. 3 is a diagram 250 representing interactions between the server (also known as group communication server) and user devices during a PTT communication process. A communication does not occur between an initiating user device 251 and a server 253 until a user activates a PTT button and selects an image to be sent with an audio message. After the user selects an image, the initiating user device 251 sends a PTT communication channel request to the server 253. Upon receiving the PTT communication channel request, the server 253 checks the availability of the PTT communication channel, and grants the PTT communication channel to the initiating user device 251 if the PTT communication channel is available. After the use of the PTT communication channel is granted to the initiating user device 251, and the initiating user device 251 receives user audio and retrieves an image code associated with the selected image. Both the user audio and the image code are transmitted to the server 253. Upon receiving the user audio and the image code, the server 253 identifies the members 255-259 of the PTT communication group that the initiating user device 251 wants to send the audio message. The server 253 also replicates the audio message and image code and sends them to each member 255-259 of the PTT communication group. When the user audio and image code are received by each member 255-259 of the PTT communication group, each member device, besides playing the user audio, retrieves an image identified by the image code and displays the image to the receiving member.

Figure 4:
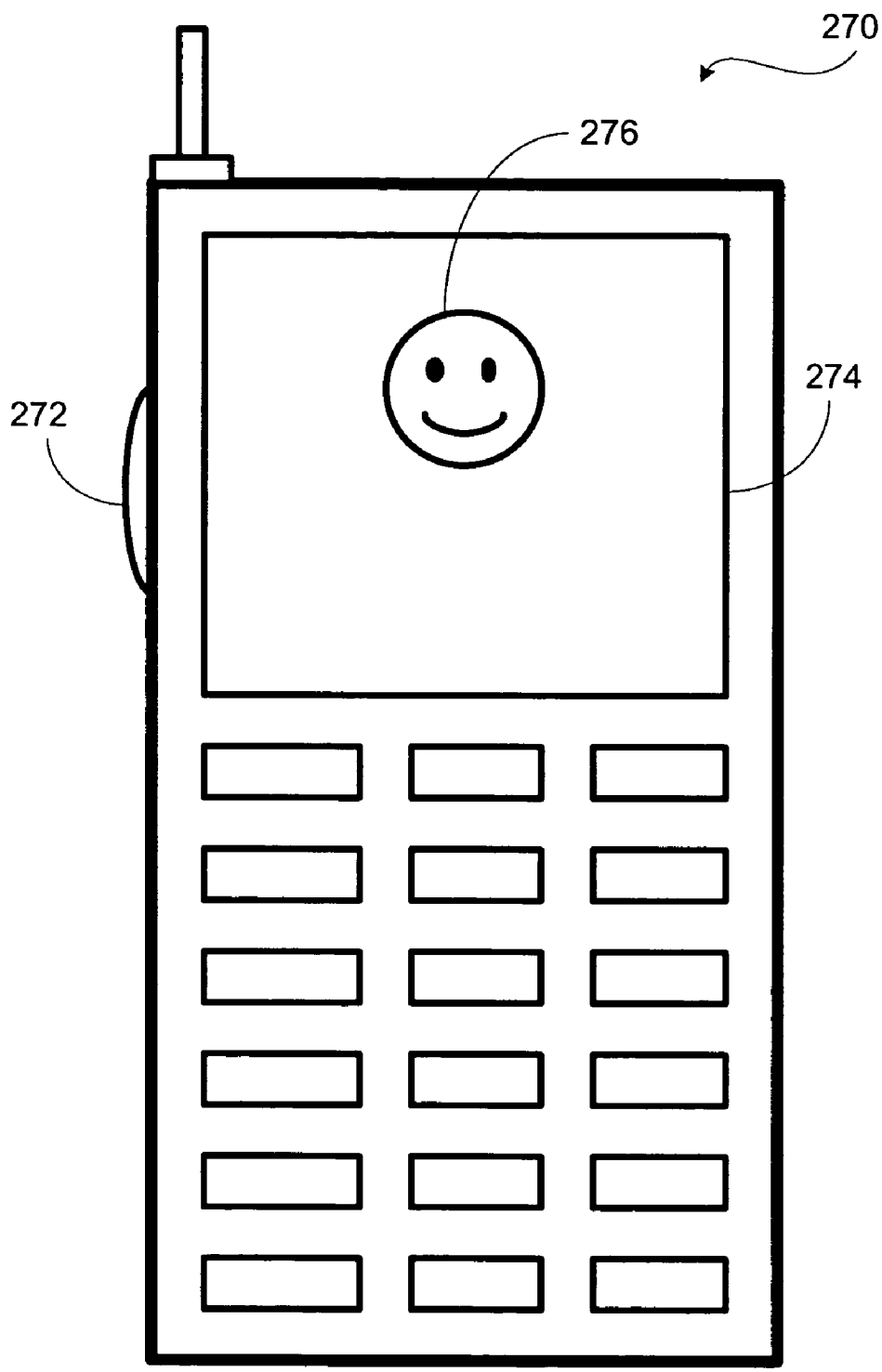
FIG. 4 is an illustration of a wireless device displaying a graphical image.

FIG. 4 illustrates a wireless communication device 270 displaying an emotive icon 276 on its display screen 274. A user activates a push-to-talk communication by pushing a push-to-talk button 272, and the push-to-talk communication is then sent to a remote server. When the wireless communication device 270 receives an image code during the push-to-talk communication from the remote server, it retrieves a graphical image 276 associated with the image code and displays it on the display screen 274.

Figure 5:
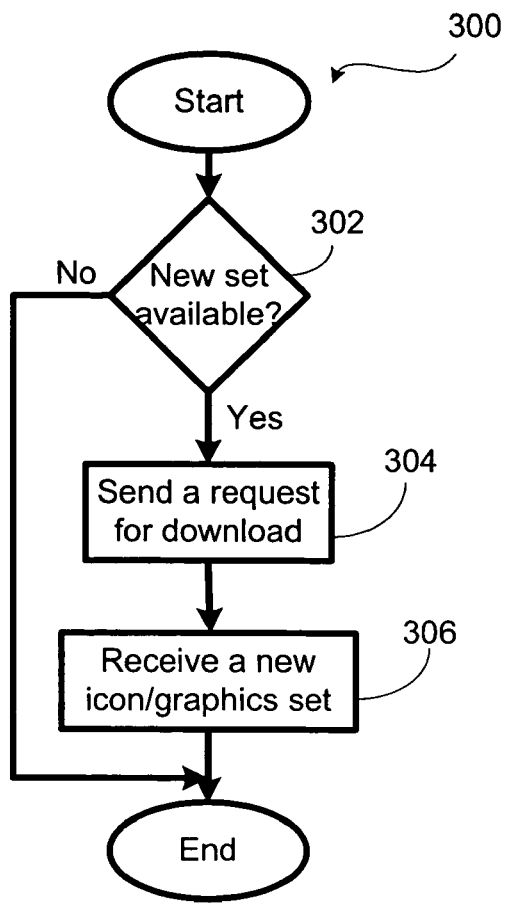
FIG. 5 is a flow chart for updating a graphical image database.

FIG. 5 is a flow chart for a graphical image update process 300. When a wireless handset 102 is powered up, the wireless handset 102 checks whether there is a new set of graphical images for the communication group to which it belongs, step 302. The wireless handset 102 compares its image set code to the image set code received from the server 116. If there is a new image set, the wireless handset 102 sends a download request to the server 116, step 304. The wireless handset 102 will then receive the new images from the server 116, step 306. The server 116 can minimize the use of bandwidth by sending only new images to the wireless handset 102 instead of sending the entire set of images.

Figure 6:
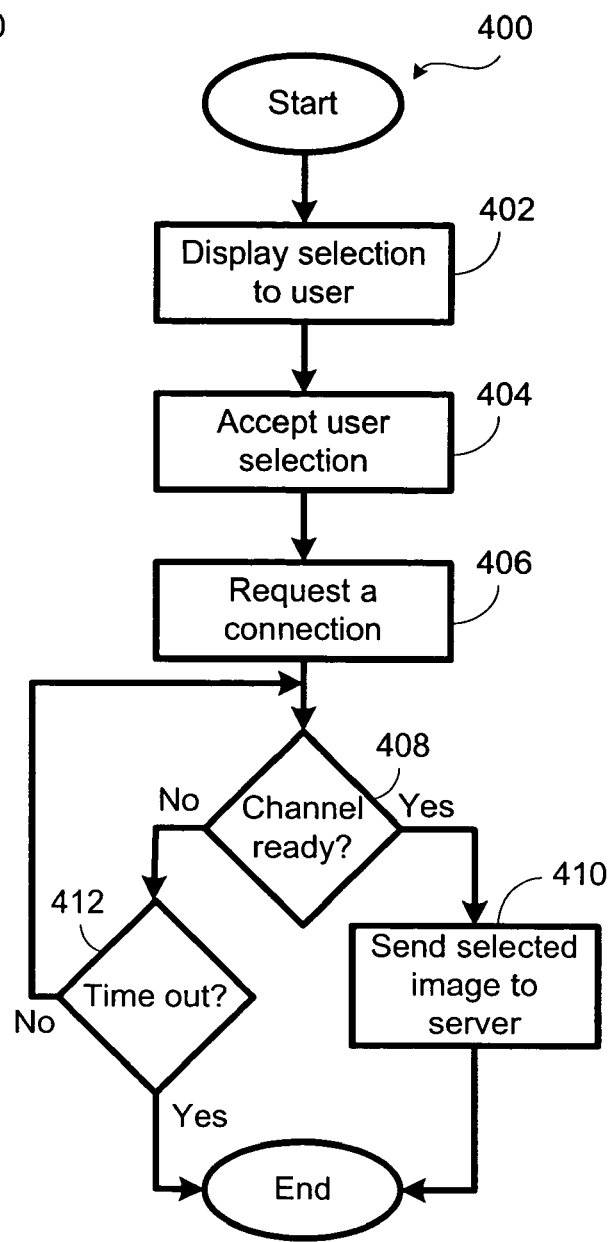
FIG. 6 is a flow chart for transmitting graphical image information in a push-to-talk system.

FIG. 6 is a flow chart for a graphical image transmitting process 400. When a user wants to communicate with other members of his or her communication group, the user activates a PTT activation unit 210. The wireless handset 102 interprets the PTT activation unit 210 and displays a predefined set of graphical images to the user, step 402. The user may select an image to be transmitted along with his audio message or alternatively the user may select an image and send only the select image to other members. After the user makes a selection, the wireless handset stores the selection, step 404, and requests a PTT connection, step 406. The PTT connection request is sent to the server 116 and the wireless handset 102 awaits the PTT communication channel. If the PTT communication channel is available, the wireless handset 102 sends the select image along with the audio communication to the server 116, step 410. If the PTT communication channel is not available, a time out will occur, step 412, and the user has to wait and retry later.

Figure 7:
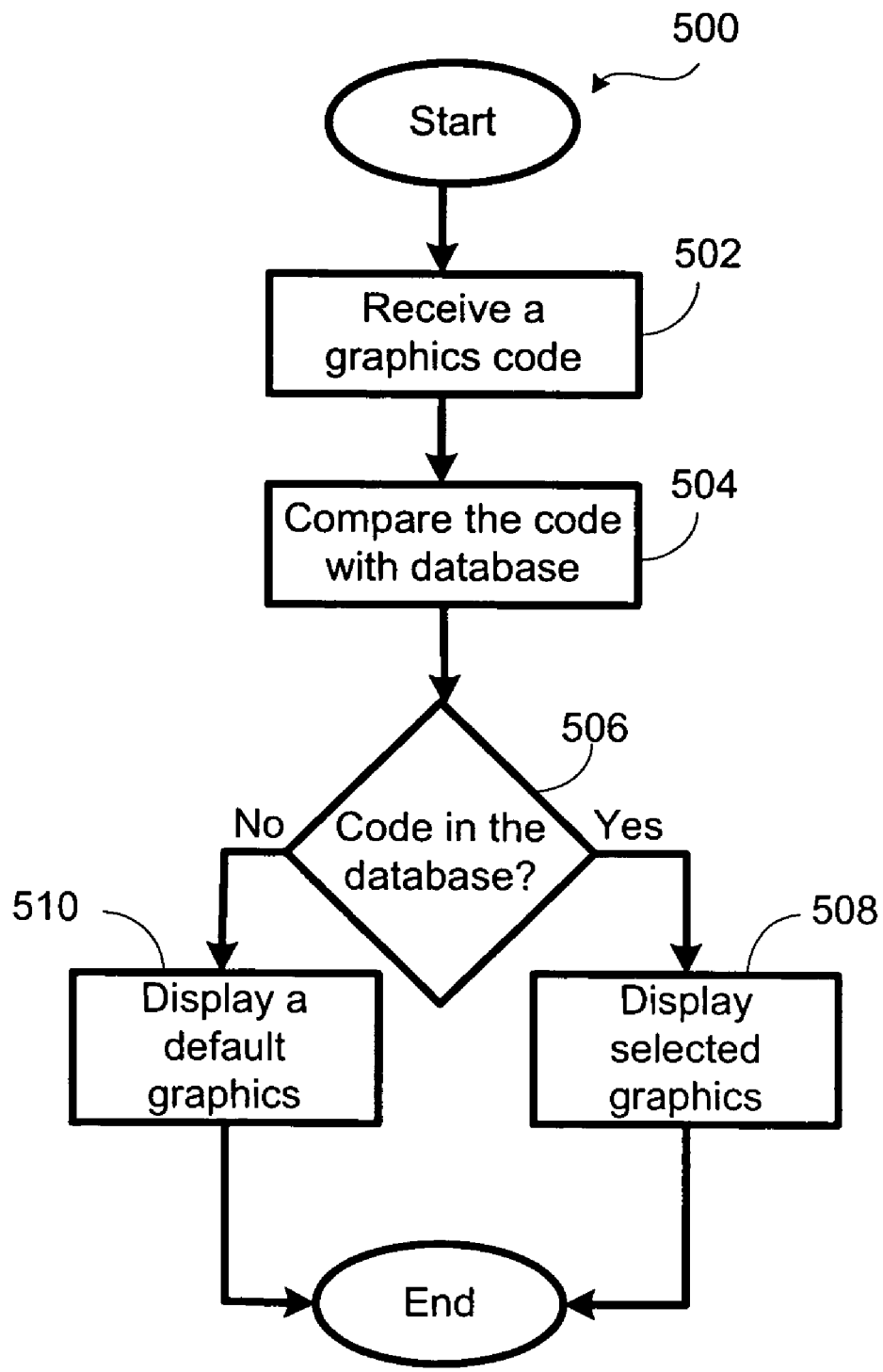
FIG. 7 is a flow chart for displaying graphical image information in a push-to-talk system.

FIG. 7 is a flow chart for a graphical image display process 500. When a wireless handset 102 receives a PTT communication with a graphics code, step 502, the handset 102 compares the graphics code with a predefined graphics database, step 504. The handset 102 checks whether the received graphics code is listed in the database, step 506. If the received graphics code is in the database, the wireless handset 102 displays the corresponding graphical image in the display unit 206, step 508. If the received graphics code is not in the database, the wireless handset 102 displays either a default graphical image or an error message in the display unit 206, step 510.

Figure 8:
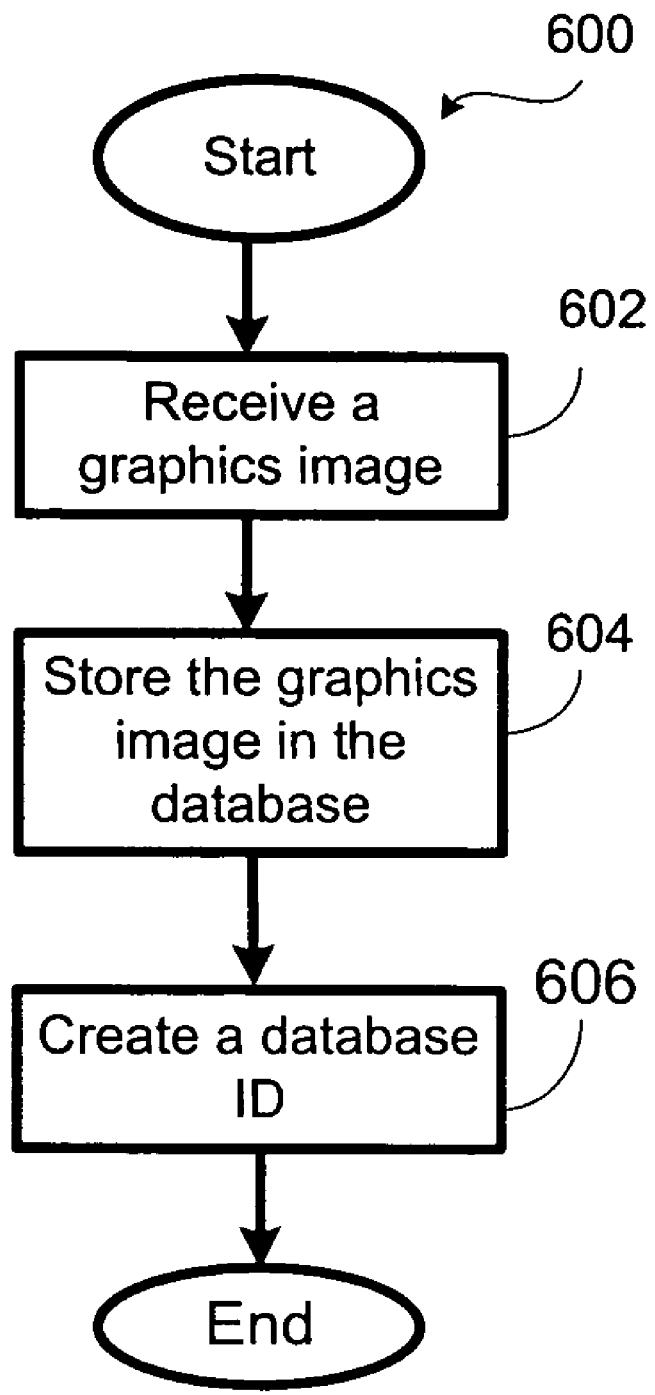
FIG. 8 is a flow chart for a graphical image database update process.

FIG. 8 is a flow chart for an image set creation process 600 at the server 116. The server 116 receives a new graphical image from a user at a remote handset 102, step 602, and stores the graphical image in the database, step 604. Every graphical image in the database is associated with a image code and the database lists all image codes of the images stored in the database. Alternatively, the new image may be from a user at a computing device connected to the server 116 via the Internet 120 or other communication channel. After storing the new graphical image, the server 116 creates a new image set identification code, step 606, to be associated with the new image set.

The following is a description of one use scenario according to one embodiment of the invention. When a user wants to communicate with a receiving party through the PTT feature, the user presses the PTT activation unit 210 on his wireless handset 102. The controller 202 interprets the pressing of the PTT activation unit 210 and displays a menu with the predefined set of graphics to the user. The user may select a predefined picture or graphical image to be sent with the PTT communications to the receiving members. The controller 202 receives and stores the user's selection of predefined graphic, then sends a PTT request through the transceiver 214 and the antenna 216 to a remote server 116. The PTT request travels as radio wave from the wireless handset 102 to a communication tower 106, where the PTT request is forwarded to the remote server 116. The link between the wireless handset 102 and the communication tower 106 is over a half-duplex communication channel, which can be either a voice channel or a data channel. The PTT communication may be conducted over a dedicated radio network. Alternatively, the PTT communication may be conducted over a wireless communication network that supports normal wireless communications.

After receiving the PTT request from a subscribing wireless handset, the server 116 determines the availability of the communication channel. If the communication channel is available, the server 116 grants the channel to the requesting wireless handset. After being granted the communication channel, the requesting wireless handset 102 retrieves a code associated with the user-selected graphical image and transmits it with audio communication to the server 116. Transmitting a code associated with a graphical image instead of the actual graphical image minimizes use of the bandwidth. The graphical images are transmitted to each handset only once when the user updates the graphical image set in the wireless handset 102.

The server 116 receives the audio communication along with the graphical code and identifies members in the PTT communication group. The server 116 replicates the audio communication and the graphical code and sends one copy of the audio communication and the graphical code to each member in the PTT communication group. A user may belong to more than one PTT communication group and may be able to send a PTT communication to any group the user is part of. The PTT request and PTT communication include a group identification code that identifies the targeted PTT communication group.

The following is another use scenario for the present invention. A user may belongs to a PTT communication group that includes his family members and closed friends and the PTT communication group may have a predefined set of graphical images that includes icons representing human emotions, such as a happy face, a frown face, a mad face, etc. The user may be in line to purchase tickets for a movie for his family members and learned the movie has been sold out. The user may use PTT to communicate this fact to his family members, and his sister may send an icon of frowning face through the PTT communication to express her disappointment instead of voicing it.

In view of the method being executable on a wireless service provider's computer device or a wireless communications device, the method can be performed by a program resident in a computer readable medium, where the program directs a server or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In the context of FIGS. 5-8, the method may be implemented, for example, by operating portion(s) of the wireless network, such as a wireless communications device or the server, to execute a sequence of machine-readable instructions. The instructions can reside in various types of signal-bearing or data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the invention has been particularly shown and described with reference to a preferred embodiment thereof, it will be understood by those skilled in the art that various changes in form and detail may be made without departing from the spirit and scope of the present invention as set forth in the following claims. Furthermore, although elements of the invention may be described or claimed in the singular, the plural is contemplated unless limitation to the singular is explicitly stated.

What is claimed is:

1. A method for transmitting graphical images information between a wireless device and a server in a push-to-talk system on a wireless telecommunication network, comprising the steps of:
   displaying a predefined set of graphical images at a wireless device, wherein a graphical image is selected for transmitting to the server, the predefined set resident on the wireless device and each graphical image in the predefined set being identified by an image code and the predefined set being associated with a first image set code;
   receiving an indication of a selected graphical image at the wireless device, wherein the indication of the selected graphical image will be transmitted from the wireless device to the server via the push-to-talk system;
   selecting at the wireless device an image code corresponding to the indication of the selected graphical image;
   transmitting the image code from the wireless device to the server via a push-to-talk communication channel
   comparing the first image set code with a second image set code received from the server, the second image set code identifying another predefined set of graphical images; and
   if the first image-set code differs from the second image set code, sending a download request for new graphical images from the wireless device to the server.

2. The method of claim 1, further comprising the steps of:
   receiving an activation request for a push-to-talk session at the wireless device; and
   transmitting the activation request from the wireless device to the server.

3. The method of claim 1, further comprising the step of receiving at the wireless device from the server an indication of availability of the push-to-talk communication channel.

4. A method for displaying graphical images in a wireless device, the graphical images being received from a server through a push-to-talk communication system, comprising the steps of:
   receiving at the wireless device a push-to-talk-request, the push-to-talk request received from the server through a push-to-talk communication channel;
   receiving an image code at the wireless device, the image code received from the server through the push-to-talk communication channel, wherein the image code represents a graphical image;
   selecting the graphical image corresponding to the image code from a predefined set of graphical images stored in the wireless device, wherein each graphical image in the predefined set of graphical images is associated with a unique image code;
   displaying the graphical image at the wireless device;
   receiving a first image set code at the wireless device, the first image set code identifying a first image set;
   comparing the first image set code with a second image set code, the second image set code identifying the predefined set of graphical images in the wireless device; and
   if the first image set code differs from the second image set code, sending a download request for new graphical images from the wireless device to the server.

5. The method of claim 4, further comprising the step of, if the image code is not listed in the predefined set of graphical images, displaying an error.

6. A method for transmitting graphical image information in a remote wireless telecommunication device received from a server in a push-to-talk system, comprising the steps of:
   receiving at the server a request for a push-to-talk session;
   receiving at the server an image code corresponding to a graphical image, the image code received from the wireless telecommunication device through a push-to-talk communication channel;
   determining a group of intended receiving wireless telecommunication devices for the push-to-talk session;

sending an indication of the push-to-talk session to each intended receiving wireless telecommunication device in the group;

sending the image code through the push-to-talk communication channel to each intended receiving wireless telecommunication device in the group;

sending a first image set code identifying a first set of images to at least one of the intended receiving wireless communication devices:

receiving a download request for new graphical images from the at least one intended receiving wireless communication device if the first image set code differs from a second image set code at the at least one intended receiving wireless communication device.

7. The method of claim 6, further comprising the steps of:
determining at the server an availability of the push-to-talk communication channel; and
if the push-to-talk communication channel is available, granting the push-to-talk communication channel to the remote wireless telecommunication device.

8. The method of claim 6, further comprising the steps of:
receiving a graphical image at the server;
storing the graphical image in an image database in the server; and
assigning a new image set identification code to the image database.

9. An apparatus for enabling transmission and display of graphical images on a wireless telecommunication device in a push-to-talk system, comprising:
a transceiver for transmitting and receiving push-to-talk communications from a remote server;
a storage unit for receiving a predefined set of graphical images from the remote server, wherein the predefined set is identified by a first image set code and includes a plurality of graphical images, each graphical image identified by an image code, the predefined set being received in response to a download request that is sent to the remote server if a second image set code identifying another set of predefined images differs from the first image set code;
a display unit for displaying graphical images in the predefined set at the wireless telecommunication device;
an interface unit for receiving an indication of a selected graphical image;
a push-to-talk interface for receiving a push-to-talk request; and
a controller for selecting the image code corresponding to the indication and transmitting the image code and the push-to-talk request to the remote server.

10. An apparatus for enabling transmission and display of graphical images on a wireless telecommunication device during a push-to-talk session, comprising:
means for transmitting and receiving push-to-talk communications from a remote server;
means for receiving a predefined set of graphical images from the remote server, wherein the predefined set is identified by a first image set code and includes a plurality of graphical images, each graphical image identified by an image code, the predefined set being received in response to a download request that is sent to the remote server if a second image set code identifying another set of predefined images differs from the first image set code;
means for displaying graphical images in the predefined set;
means for receiving an indication of a selected graphical image;
means for receiving a push-to-talk request; and
controller means for selecting the image code corresponding to the indication and transmitting the image code and the push-to-talk request to the remote server.

11. A computer-readable medium on which is stored a computer program for transmitting graphical images information between a wireless device and a server in a push-to-talk system on a wireless telecommunication network, the computer program comprising computer instructions that when executed by a computer perform the steps of:
displaying a predefined set of graphical images at a wireless device, wherein a graphical image is selected for transmitting to the server, the predefined set resident on the wireless device and each graphical image in the predefined set being identified by an image code and the predefined set being associated with a first image set code;
receiving an indication of a selected graphical image at the wireless device, wherein the indication of the selected graphical image will be transmitted from the wireless device to the server via the push-to-talk system;
selecting at the wireless device an image code corresponding to the indication of the selected graphical image;
transmitting the image code from the wireless device to the server via a push-to-talk communication channel;
comparing the first image set code with a second image set code received from the server, the second image set code identifying another predefined set of graphical images; and
if the first image set code differs from the second image set code, sending a download request for new graphical images from the wireless device to the server.

12. The computer program of claim 11, further performing the steps of:
receiving an activation request for a push-to-talk session at the wireless device; and
transmitting the activation request from the wireless device to the server.

13. The computer program of claim 11, further performing the step of receiving from the server an indication of availability of the push-to-talk communication channel.

14. A computer-readable medium on which is stored a computer program for displaying graphical images in a wireless device, the graphical images being received from a server through a push-to-talk communication system, the computer program comprising computer instructions that when executed by a computer perform the steps of:
receiving at the wireless device a push-to-talk request at the wireless device, the push-to-talk request received from the server through a push-to-talk communication channel;
receiving an image code at the wireless device, the image code received from the server through the push-to-talk communication channel, wherein the image code represents a graphical image;
selecting the graphical image corresponding to the image code from a predefined set of graphical images stored in the wireless device, wherein each graphical image in the predefined set of graphical images is associated with a unique image code;
displaying the graphical image at the wireless device;
receiving a first image set code at the wireless device, the first image set code identifying a first image set;
comparing the first image set code with a second image set code, the second image set code identifying the predefined set of graphical images in the wireless device; and if the first image set code differs from the second image set code, sending a download request for new graphical images from the wireless device to the server.

15. The computer program of claim 14, further performing the step of, if the image code is not listed in the predefined set of graphical images, displaying an error.

16. A computer-readable medium on which is stored a computer program for transmitting graphical image information in a remote wireless telecommunication device received from a server in a push-to-talk system, the computer program comprising computer instructions that when executed by a computer perform the steps of:

receiving at the server a request for a push-to-talk session;
receiving at the server an image code corresponding to a graphical image, the image code received from the wireless telecommunication device through a push-to-talk communication channel;
determining a group of intended receiving wireless telecommunication devices for the push-to-talk session;
sending an indication of the push-to-talk session to each intended receiving wireless telecommunication device in the group;
sending the image code through the push-to-talk communication channel to each intended receiving wireless telecommunication device in the group;
sending a first image set code identifying a first set of images to at least one of the intended receiving wireless communication devices;
receiving a download request for new graphical images from the at least one intended receiving wireless communication device if the first image set code differs from a second image set code at the at least one intended receiving wireless communication device.

17. The computer program of claim 16, further performing the steps of:

determining at the server an availability of the push-to-talk communication channel; and
if the push-to-talk communication channel is available, granting the push-to-talk communication channel to the remote wireless telecommunication device.

18. The computer program of claim 16, further performing the steps of:

receiving a graphical image at the server;
storing the graphical image in an image database in the server; and
assigning a new image set identification code to the image database.

19. A system for transmitting and displaying graphical images during a push-to-talk communication session in a wireless communication network, comprising:

a server in communication with the wireless communication network, the server including information on at least one push-to-talk communication group with a plurality of members; and
a plurality of wireless communication devices capable of communicating with the server through the wireless communication network, each wireless communication device having a predefined set of graphical images, each graphical image in the predefined set being identified by an image code, each different predefined set of graphical images identified by a different image set code;
wherein a first wireless communication device transmits an image code with a push-to-talk communication to the server, the server transmits the image code with the push-to-talk communication to a second wireless communication device, and the second wireless communication device receives the image code with the push-to-talk communication and displays an image identified by the image code,
and wherein the first wireless communication device or the second wireless communication device compares a first image set code identifying a first predefined set of graphical images with a second image set code received from the server and identifying a second predefined set of graphical images, such that if the first image set code differs from the second image set code, the first or second wireless communication device sends a download request for new graphical images to the server.

20. The system of claim 19, wherein the server further includes a predefined set of graphical images.

21. The system of claim 19, wherein the predefined set is identified by an image set code.

22. The system of claim 19, wherein the predefined set is identified by an image set code.

* * * * *

UNITED STATES PATENT AND TRADEMARK OFFICE
CERTIFICATE OF CORRECTION

| | | |
|---|---|---|
| PATENT NO. | : 7,725,119 B2 | Page 1 of 1 |
| APPLICATION NO. | : 10/924479 | |
| DATED | : May 25, 2010 | |
| INVENTOR(S) | : Kies | |

It is certified that error appears in the above-identified patent and that said Letters Patent is hereby corrected as shown below:

Column 08, line 16, claim 1: "image-set" to read as --image set--

Column 08, line 31, claim 4: "push-to-talk-request" to read as --push-to-talk request--

Column 09, line 01, claim 6: "devices:" to read as --devices;--

Signed and Sealed this
Seventh Day of August, 2012

David J. Kappos
*Director of the United States Patent and Trademark Office*